(No Model.)  
2 Sheets—Sheet 1.

F. H. RICHARDS.
WEIGHING MACHINE.

No. 560,542.  Patented May 19, 1896.

Witnesses:  
S. W. Potts.  
Fred. J. Dole.

Inventor:  
F. H. Richards.

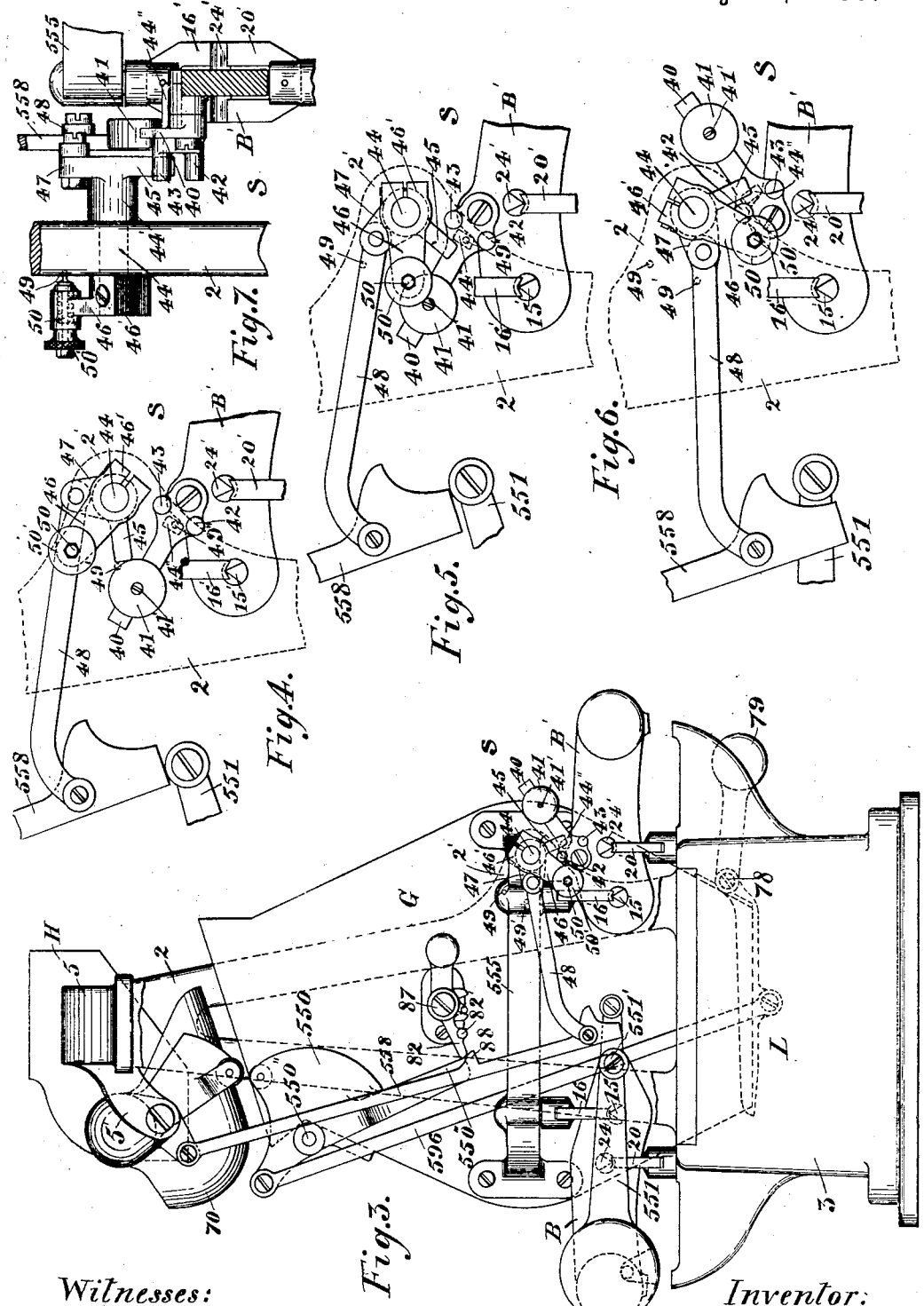

UNITED STATES PATENT OFFICE.

FRANCIS H. RICHARDS, OF HARTFORD, CONNECTICUT.

WEIGHING-MACHINE.

SPECIFICATION forming part of Letters Patent No. 560,542, dated May 19, 1896.

Application filed November 29, 1895. Serial No. 570,338. (No model.)

*To all whom it may concern:*

Be it known that I, FRANCIS H. RICHARDS, a citizen of the United States, residing at Hartford, in the county of Hartford and State of Connecticut, have invented certain new and useful Improvements in Weighing-Machines, of which the following is a specification.

My invention relates to weighing-machines; and the object of the invention is to provide improved testing means whereby the accuracy of a completed load may be readily ascertained.

Figure 2:
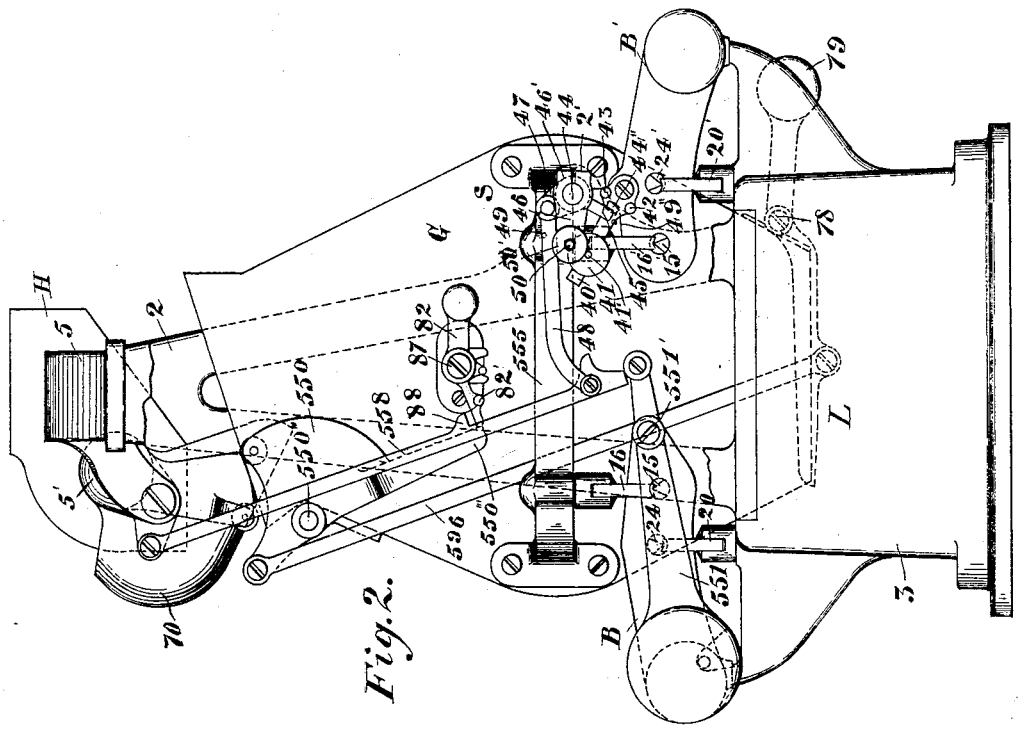
Figure 1:
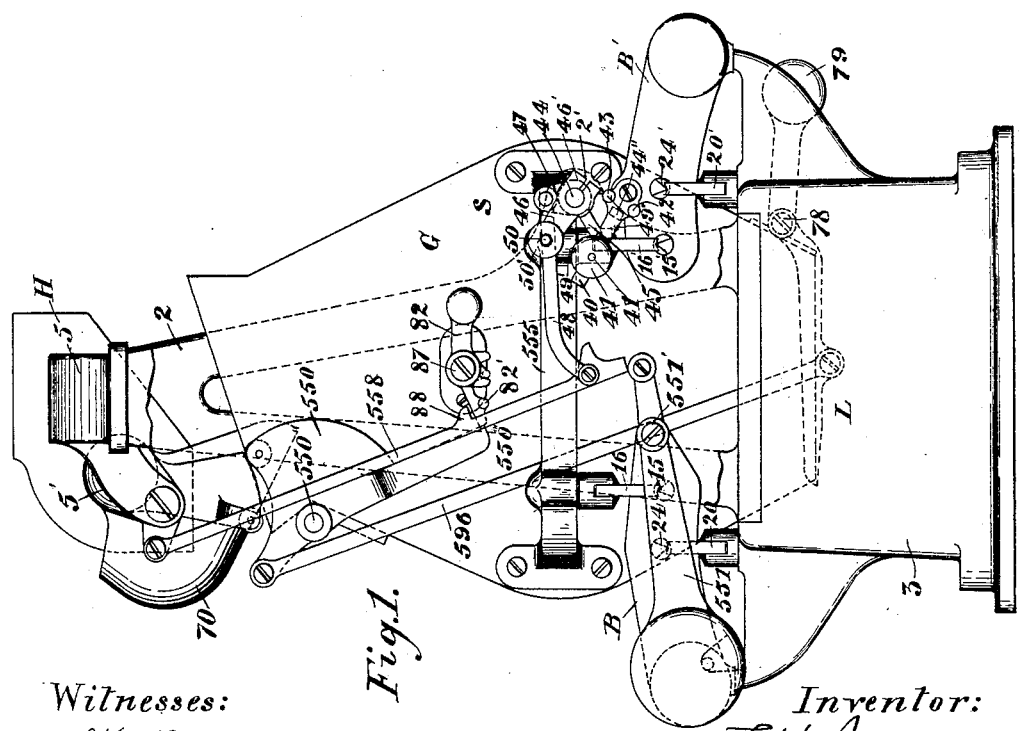

In the drawings accompanying and forming part of this application, Figure 1 is a right-hand end elevation of a weighing-machine embodying my present improvements, the poiser thereof being illustrated in the normal or weighing position. Fig. 2 is a similar view of the machine, the poiser being illustrated in a position similar to that shown in Fig. 1, and the operating and adjacent parts thereof being illustrated in the preliminary testing position. Fig. 3 is a view similar to Figs. 1 and 2, showing the machine, the poiser thereon, and the operative parts of the latter in the secondary testing or balancing position, the poiser having been shifted from the position in which it is shown in Figs. 1 and 2. Figs. 4, 5, and 6 are enlarged detail views, in right-hand elevation, of the poiser and its operating and adjacent parts of the weighing mechanism, the poiser being shown in positions corresponding, respectively, with Figs. 1, 2, and 3; and Fig. 7 is an enlarged detail view, in front elevation, of the poiser and its operating parts in a position corresponding with Figs. 1 and 4.

Similar characters represent like parts in all the figures of the drawings.

For convenience in illustrating the nature and purpose of my present improvements these are shown applied to a weighing-machine substantially similar to the improved weighing-machine disclosed and claimed in Letters Patent No. 548,840, granted to me October 29, 1895, to which reference may be had, and which will be briefly described; but it will be obvious that these improvements may be as efficaciously applied to other types of weighing-machines.

The framework for carrying the operative parts of the weighing-machine may be of any suitable construction, and is shown in the drawings comprising two side frames or uprights 2 and 4, mounted upon a chambered supporting-base 3 and connected by a top plate 5, which latter is illustrated carrying a supply chute or hopper H. The base 3 is illustrated provided with some suitable beam-supports, such as the V-shaped bearings 20 and 20', for carrying the beam mechanism, which latter supports the bucket mechanism, consisting of the bucket and its operative devices for ascending and descending movements therewith. The beam mechanism is shown consisting of a pair of oppositely-disposed scale-beams B and B', which are illustrated pivotally supported by means of the pivots or knife-edges 24 and 24', resting on the V-shaped bearings 20 and 20', carried by the base 3.

The arms of the scale-beams, intermediate the knife-edges 24 and 24', are shown provided with bucket-supports, which are shown as the knife-edges 15 and 15'.

The bucket or load receptacle G carries hangers on each end thereof, one of these being illustrated at 555, which latter is shown carrying V-shaped bearings 16, which are pivotally supported by the knife-edges 15 and 15' of the scale-beams B and B', the bucket receiving the mass of material to be weighed in the form of a stream which is supplied by the chute H.

The machine has the usual poising and counterpoising mechanisms. All that part of the beam mechanism lying or located outside of the pivots 24 and 24' constitutes the counterpoising mechanism of the machine, and all that part of the beam mechanism intermediate of said pivots, including the bucket mechanism, constitutes the poising mechanism of the machine.

The bucket mechanism consists of two members, one of which is shiftable relatively to the other for discharging the bucket-load, and the bucket-closer L is shown constituting the shiftable member of the said mechanism. The closer L is illustrated pivoted at 78 to the lower forward side of the bucket G adjacent to the discharge-opening thereof and provided with a forwardly-extending counterweighted arm 79, preferably formed integral therewith, the counterweight thereon serving to return the closer to the closed position thereof.

As a means for supporting the closer L an inverted toggle connection is shown connecting the closer and the bucket and is so positioned as to be engaged by a closer-latch when the latch is in its operated position and the closer is shut. In the form shown this toggle connection comprises some suitable rocker— such, for instance, as 550—pivoted adjacent to the upper rearward side of the bucket G and having a long connecting-rod 596 pivoted, respectively, to the rocker and to the closer in such manner that when the closer is shut the two pivots of said connecting-rod will be nearly in line with and the upper of said pivots will be above the rocker-pivot, whereby when the rocker is engaged by the closer-latch and held in that position the closer will be supported with a minimum pressure on the latch, as practically all of the weight of the bucket contents will be carried by the pivot 550'' of the rocker.

The closer-latch for locking the rocker in position when the closer is shut, and which is designated by 82, is shown pivoted at 87 to the bucket G in position for engaging a stop or detent 550''' on the rocker 550 when the parts are in the closed position. The latch 82 is shown counterweighted, and it will be evident that the closer-latch swings upward to engage the rocker and hence will be released therefrom by a downward movement.

As a means for controlling the supply-stream from the supply-chute a stream-controlling valve, similar to the improved valve disclosed and claimed in Letters Patent No. 535,727, granted to me March 12, 1895, is illustrated at 70 and is pivotally supported for oscillatory movement beneath the discharge orifice or opening of the supply-chute, said valve being pivoted within arms or brackets depending from the top plate 5 of the machine, one of which is illustrated at 5'.

As a means for closing the valve suitable valve-closing mechanism (not shown) may be employed. For example, the improved valve-closing mechanism disclosed and claimed in Letters Patent No. 548,843, granted to me October 29, 1895, may be used.

As a means for opening the valve the mechanism disclosed and claimed in Letters Patent No. 548,839, granted to me October 29, 1895, may be employed, which will now be described. The valve 70 is shown in the drawings having a long connecting-rod 558 depending from and operative therewith and pivotally secured to the upper rearward portion thereof and having the lower end of said rod in position to be engaged by a valve-opening actuator. The connecting-rod 558 is illustrated constituting the means for transmitting to the valve the valve-opening movement or thrust of a valve-opening actuator, and that valve-actuator, which has for its function the operation of opening the valve, is illustrated pivotally supported by the scale-beam B. In the form illustrated this valve-actuator consists of a counterpoised lever 551, pivoted at 551' to the scale-beam B. It will be noticed that the pivot 551' of this actuator 551 is shown located between the bucket-supports, so that any downward pressure exerted on the inner end of the actuating-lever 551 relatively to the bucket will oscillate said lever, and that a very slight pressure will be necessary for shifting or oscillating the same.

The connecting-rod 558 has been described as having its lower end in position to be engaged by a valve-opening actuator, and hence it will be apparent that the lever 551 constitutes the valve-opening actuator for engaging said rod. When free to actuate the valve to open the same, this rod forms a part of the actuating means and therefore a part of the valve-opening actuator, but when the closing movement of the valve 70 is limited it will be evident that this rod serves as a stop device or valve-movement stop for limiting or checking the valve-closing movement of the valve-actuator 551 during the descent of the bucket.

It will be remembered that a latch 82 has been described for holding the bucket-closer L against opening movement, said latch engaging a detent 550''' on the rocker 550, and that said latch is released by a downward pressure or movement thereon, thereby also releasing the shiftable member of the bucket mechanism, which is illustrated as the bucket-closer L. For tripping said latch 82 I prefer to employ a load-discharger or latch-actuator operated by the power of the closing-valve 70, which load-discharger is normally operative for tripping said latch and thereby releasing the bucket-closer just succeeding the cut-off of the supply-stream by the valve 70.

The load-discharger or latch-actuator is illustrated at 88 as carried by the connecting-rod 558, which latter has been described as carried by the valve 70. During the closing movement of the valve the connecting-rod 558 will have a descending movement, and just succeeding the cut off of the supply-stream the load-discharger or latch-actuator 88, which is carried by said connecting-rod, will engage a pin 82' on the latch 82, thereby depressing said latch. The bucket-closer L, being then free of all restraint, will by reason of the weight of the material within the bucket and resting thereon be opened for discharging the bucket-load. The load-discharger 88, as hereinbefore described, is normally operative for releasing the shiftable member of the bucket mechanism, but in a manner to be hereinafter described may be thrown into an inoperative position, whereby on the descending movement of the connecting-rod 558, and hence the load-discharger 88, the latter will be ineffective for releasing the shiftable member of the bucket mechanism.

My present improvements contemplate employing, in connection with a weighing-machine embodying a poiser, a shifter for shifting said poiser between two positions and free thereof when the poiser is in each of said positions.

In weighing materials it is necessary, before the bucket can descend to the poising-line, to secure in the bucket a load, which, added to the total weight of the poising mechanism, will counterbalance or equal the weight of the counterpoising mechanism, and a part of this load must be reckoned that small portion of the supply-stream which is in the air at some point between the discharge edge of the valve and the mass of material already in the bucket. Instead of deferring the descent of the bucket until the complete load is made up therein, the poiser or poise-weight hereinbefore alluded to will be provided. This poiser or poise-weight is movably supported for shifting movement between two positions, one for the weighing operation and the other for the balancing of the machine. The poiser, which is forcibly shiftable between these two positions, is of a mass and stroke corresponding to the loading, differential, or the difference in weight, between a balancing load and a running load—that is, a load as made up by the bucket, subjected to its momentum.

The poiser or poise-weight is practically a subtraction from the weight of the counterpoising mechanism, and is, during the weighing operation, transferred from the counterpoising mechanism to the poising mechanism. Hence this poiser or poise-weight normally exerts its force on the poising mechanism and is effective at a point just preceding the completion of a bucket-load for causing, together with the partial load already in the bucket, the descent of the bucket to the poising-line, the residue of the supply-stream, or that portion thereof between the discharge edge of the valve and the mass already in the bucket, and which is necessary to complete the bucket-load, flowing into the bucket during its descent and before it reaches the poising-line.

When it is desired to make a test to ascertain if the machine is weighing accurately, it will be simply necessary to shift the poiser from its normal position, the load-discharger having been thrown into an inoperative position, and to transfer the effective force of said poiser onto the counterpoising mechanism, thereby subtracting a like weight from the poising mechanism, when, if a true and accurate load be in the bucket, the bucket and the beam mechanisms will assume true poised positions on the poising-line, and the total weight of the poising mechanism, including the bucket-load, and the total weight of the counterpoising mechanism will be found to exactly balance.

The poiser or poise-weight is illustrated shiftably supported on the beam mechanism and at such a point thereon for shifting movement between two positions, one for the weighing operation and the other for the balancing of the machine, a poiser-shifter, which is normally free of said poiser when in each of its said working positions, being employed for engaging and shifting the poiser from one to the other of its said positions.

The scale-beam B' is illustrated as pivotally carrying, for oscillatory movement thereon, the supplemental beam or lever 40, which is shown provided with the weight 41, which constitutes the poiser or poise-weight, said weight being adjustable along the lever 40, for a purpose to be hereinafter described, and being shown held in an adjusted position by means of the screw 41'. The poiser 41 may be located at any point on the beam mechanism, so as to exert its force on the poising mechanism during the weighing operations, and when a test or balance is to be made the poiser may be shifted to exert its force on the counterpoising mechanism—that is to say, the poiser will be shiftable between two working positions relative to the fulcrum or center of movement of the scale-beam B', one of these positions being for the weighing position and the other for the balancing position.

The normal position of the poiser is illustrated in Figs. 1, 2, 4, 5, and 7, being, as hereinbefore stated, a subtraction from the weight of the counterpoising mechanism, and hence during the weighing operation the effective force thereof is added to the total weight of the poising mechanism. The poiser, as hereinbefore pointed out, normally exerts a force on the poising mechanism equal to the weight of that small portion of material which is necessary to complete the bucket-load and which is in the air at some point between the discharge edge of the valve and the mass already in the bucket, just succeeding the cut off of the supply-stream.

If at any time during the operation of the machine a test is to be made to ascertain if the machine is working properly, it will simply be necessary to shift the poiser 40 so that the effective force thereof will be exerted on the counterpoising mechanism, at which time, if there be a correct load in the bucket, the total poising mechanism, including the bucket-load, and the total counterpoising mechanism, including the poiser, will be found to exactly agree. If the mass in the bucket be either under or over a true bucket-load, the poiser 41 may be moved in either direction along the lever 40 and adjusted in a proper position thereon by means of the screw 41' to compensate for any difference.

My present improvements contemplate the provision of a shifter or other suitable means for shifting the poiser 41 between its two positions, and which, when said poiser is in either of said positions, will be free thereof. The poiser-shifter, which is designated in a general way by S, will also be operatively connected with the load-discharger 88 or other device or mechanism which controls the discharge of the bucket, so that when said poiser is shifted or thrown to one of its said positions the load-discharger 88 will also be shifted or thrown into an inoperative position. The poiser-carrying beam or lever 40 is illustrated as provided at a point adjacent the pivot or center of movement thereof with the projecting pintles 42 and 43, which are shown located above the center of movement thereof and as disposed in the path of movement of a device carried by the shifter S. It will be apparent that the poiser being in the position illustrated in Figs. 1, 2, 4, and 5, the pintle 43 being engaged and sufficient pressure applied thereto, the lever 40 and hence the poiser 41 may be oscillated or shifted, so that the effective force of the latter may be exerted on the counterpoising mechanism, as indicated in Figs. 3 and 6. Hence it will be likewise apparent that when the pintle 42 is thus engaged and pressure applied thereto the lever 40, and hence the poiser, will be oppositely shifted and returned to its normal position, as illustrated in Figs. 1, 2, 4, and 5.

Means are also provided for maintaining the poiser in either one of its shifted positions, and the means illustrated is a stop or stop-arm 44″, projecting laterally from the lever 40, for engaging the beam B′ when the poiser is in either of its said positions.

The side frame 2 (illustrated by dotted lines in Figs. 1 to 6, inclusive) is shown provided with a bulge or enlargement 2′, in which is illustrated, supported for rocking movement, the rock-shaft 44, having the enlarged portion 44′ on the inner end thereof. The portion 44′ of the rock-shaft 44 is illustrated carrying the downwardly-extending actuating lever or arm 45, which is adapted for engaging the pintles 42 and 43, whereby, when said shaft 44 is rocked, said lever or arm 45 may engage either of the pintles 42 and 43 for forcibly shifting the poiser 41 between its two positions.

As a means for rocking the shaft 44 it is shown carrying at the outer end thereof the handle 46, the latter being held in fixed position thereon by means of the clamp 46′ of well-known construction. The portion 44′ is illustrated provided with a crank-arm 47, to which is shown pivoted the connecting-link 48, the opposite end of the latter being also illustrated pivotally connected with the connecting-rod 558, which latter is shown carrying the load-discharger 88.

It will be remembered that the load-discharger 88 has a normal movement into engagement with a stop 82′, carried by the latch 82, for tripping said latch to thereby release the shiftable member of the bucket mechanism, and that said load-discharger 88 is thrown into an inoperative position when it is desired to make a test. Hence it will be evident that when the shaft 44 is rocked the crank-arm 47 will have a rocking movement therewith, so that said load-discharger 88, through the operative connections with said rock-shaft 44, may be thrown into its inoperative position or returned to its normally operative position for releasing the shiftable member of the bucket mechanism. The shifter has successive shifting movements, and means are employed for maintaining the shifter against movement when it is in either one of its successive positions. The first or preliminary movement of the shifter will not affect the position of the poiser, but will merely throw the load-discharger into an inoperative position, as indicated by Fig. 2. On the further movement of the shifter the load-discharger 88 will be carried farther away from the pin 82′, and said shifter during this said second movement will engage the poiser and force the same from its normal position, so that the effective force thereof, when the poiser is so shifted, will not be exerted on the poising mechanism, and, as hereinbefore described, the shifter will be free of the poiser when in each of its said shifted positions. The side frame 2 is illustrated provided with a circular series of recesses 49, 49′, and 49″, and the handle 46, by which the shifter S is worked, is illustrated carrying a spring-bolt 50, which is adapted for entering any one of the circular series of holes 49, 49′, and 49″ to thereby maintain the shifter in a fixed position.

It will be assumed that it is desired to make a test and that the shifter, the poiser, and the load-discharger are in the positions indicated in Fig. 1. The thumb-piece 50′ is grasped and pulled outwardly, thereby withdrawing the spring-bolt 50 from the recess 49, and the handle 46 is pulled downwardly, this action throwing the connecting-rod 558 to the left, so that the load-discharger 88 thereon will be thrown into an inoperative position or away from the pin 82′ on the latch 82, the preliminary testing position, as indicated in Fig. 2.

It will be observed that in the preliminary testing position of the machine the connecting-rod 558, which serves also as a valve-movement stop, is in operative relation with the shiftable member 551, to thereby limit the movement of the valve 70 during the descending movement of the bucket. When the valve has closed and the bucket-load is supposed to be complete, to ascertain if the correct load is therein the various mechanisms will be thrown to the secondary testing position—that is, the thumb-piece 50′ will be grasped and pulled outwardly, and the spring-bolt 50 thereby withdrawn from the second recess 49″ in the side frame 2, and the handle 46 being pulled downwardly the crank-arm 47 will be revolved, this action throwing the connecting-link 48 to the left and also moving the load-discharger 88 farther away from the pin 82′, carried by the latch. On the second movement of the shifter S the actuating-lever 45 will engage the pintle 43, carried by the poiser, and, as hereinbefore stated, when pressure is applied thereto the lever 40 will be oscillated about its pivot on the beam B' until the center of gravity of the poiser 41 has intersected a vertical line passing through the center of movement of the lever 40, when the poiser will fall to the secondary testing or balancing position by its own weight. The valve being closed and the bucket then free of all restraint, the latter will, if it carries a true load, after a few oscillations assume a true poised position on the poising-line. To return the poiser 41 to its normal position, as indicated in Figs. 1, 4, &c., the thumb-piece 50' will be grasped, the spring-bolt 50 therein being withdrawn from the recess, and the handle 46 will be revolved in an upward direction. On this movement of the handle the actuating-lever 45 will engage the pintle 42, and, pressing thereagainst, the lever 40 will be oscillated until the center of gravity of the poiser 41 has crossed the vertical line passing through the center of movement of the lever 40, when the poiser will simply drop to its normal position. During this last-mentioned operation the connecting-rod 48 will be drawn to the right and hence carry the load-discharger 88 to its normal position.

Having thus described my invention, what I claim is—

1. In a weighing-machine, the combination with beam mechanism embodying a scale-beam, and a bucket supported thereby; of a testing-poiser pivotally supported by said scale-beam for movement between two predetermined positions thereon; means for maintaining said poiser in each of its positions; and a device for shifting said poiser, to transfer the effective force thereof from the beam to the bucket, and vice versa.

2. In a weighing-machine, the combination with beam mechanism embodying a scale-beam, and with bucket mechanism supported thereby, the latter embodying two members, one of which is shiftable relatively to the other for discharging the bucket-load; of a latch normally operative for holding said shiftable member against movement; a latch-actuator normally operative for depressing said latch, to thereby release said shiftable member; a testing-poiser supported by said scale-beam for movement between two positions thereon; means for maintaining said poiser in each of its positions; a device for shifting said poiser between each of said positions on said beam; and means for connecting said device with the latch-actuator.

3. In a weighing-machine, the combination with beam mechanism embodying a scale-beam and with a bucket supported thereby; of a weighted arm, constituting a testing-poiser, pivoted to said scale-beam; a shifter for shifting said arm between two positions relatively to the scale-beam; and a stop on said arm adapted for engaging said scale-beam when said arm is in each of its shifted positions.

4. In a weighing-machine, the combination with beam mechanism embodying a scale-beam, and with a bucket supported thereby, of an arm pivoted to said scale-beam, and having pins thereon; and a shifter embodying a device for engaging said pins, to thereby shift said arm between two positions relatively to the scale-beam.

5. In a weighing-machine, the combination with beam mechanism embodying a scale-beam, and with bucket mechanism embodying two members, one of which is shiftable relatively to the other for discharging the bucket-load; of a latch normally operative for holding said shiftable member against movement; a latch-actuator normally operative for depressing said latch, to thereby release said shiftable member; an arm pivoted to said scale-beam and shiftable between two positions, and having a stop adapted for engaging said scale-beam when the arm is in each of said positions, said arm also having pins thereon; and a shifter having a device adapted for engaging said pins, to thereby shift said arm relatively to the scale-beam; and means connecting said shifter with the latch-actuator.

FRANCIS H. RICHARDS.

Witnesses:
FRED J. DOLE,
HENRY BISSELL.